(12) United States Patent
Bigioi et al.

(10) Patent No.: US 8,411,912 B2
(45) Date of Patent: Apr. 2, 2013

(54) FACE RECOGNITION USING FACE TRACKER CLASSIFIER DATA

(75) Inventors: Petronel Bigioi, Galway (IE); Peter Corcoran, Claregalway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 679 days.

(21) Appl. No.: 12/631,733

(22) Filed: Dec. 4, 2009

(65) Prior Publication Data

US 2010/0141787 A1 Jun. 10, 2010

Related U.S. Application Data

(60) Provisional application No. 61/120,289, filed on Dec. 5, 2008.

(51) Int. Cl.
*G06K 9/00* (2006.01)
(52) U.S. Cl. ........ 382/118; 340/5.53; 340/5.83; 713/186
(58) Field of Classification Search .......... 382/115–127; 340/5.1, 5.2, 5.52, 5.53, 5.83; 713/186; 902/3; 356/71
See application file for complete search history.

(56) References Cited

U.S. PATENT DOCUMENTS

| | | | |
|---|---|---|---|
| 6,389,181 B2 | 5/2002 | Shaffer et al. |
| 7,046,339 B2 | 5/2006 | Stanton et al. |
| 7,218,759 B1 | 5/2007 | Ho et al. |
| 7,269,292 B2 | 9/2007 | Steinberg |
| 7,315,630 B2 | 1/2008 | Steinberg et al. |
| 7,315,631 B1 | 1/2008 | Corcoran et al. |
| 7,317,815 B2 | 1/2008 | Steinberg et al. |
| 7,362,368 B2 | 4/2008 | Steinberg et al. |
| 7,403,643 B2 | 7/2008 | Ianculescu et al. |
| 7,440,593 B1 | 10/2008 | Steinberg et al. |
| 7,460,694 B2 | 12/2008 | Corcoran et al. |
| 7,460,695 B2 | 12/2008 | Steinberg et al. |
| 7,466,866 B2 | 12/2008 | Steinberg |
| 7,469,055 B2 | 12/2008 | Corcoran et al. |
| 7,469,071 B2 | 12/2008 | Drimbarean et al. |
| 7,551,755 B1 | 6/2009 | Steinberg et al. |
| 7,555,148 B1 | 6/2009 | Steinberg et al. |
| 7,558,408 B1 | 7/2009 | Steinberg et al. |

(Continued)

FOREIGN PATENT DOCUMENTS

| KR | 10-2004-0034342 A | 4/2004 |
| KR | 10-2006-0003666 A | 1/2006 |

(Continued)

OTHER PUBLICATIONS

Froba, B. and Ernst, A., Face detection with the modified census transform, in Automatic Face and Gesture Recognition, 2004; Sixth IEEE International Conference on, May 17-19, 2004 pp. 91-96 of Proceedings.

(Continued)

*Primary Examiner* — Aaron W Carter
(74) *Attorney, Agent, or Firm* — Andrew V. Smith

(57) ABSTRACT

A method of determining face recognition profiles for a group persons includes determining with a multi-classifier face detector that a face region within a digital image has above a threshold probability of corresponding to a first person of the group, and recording probability scores which are analyzed for each classifier, including determining a mean and variance for each classifier for the first person. The process is repeated for one or more other persons of the group. A sub-set of classifiers is determined which best differentiates between the first person and the one or more other persons. The sub-set of classifiers is stored in association with the first person as a recognition profile.

27 Claims, 7 Drawing Sheets

U.S. PATENT DOCUMENTS

| | | | |
|---|---|---|---|
| 7,564,994 | B1 | 7/2009 | Steinberg et al. |
| 7,587,068 | B1 | 9/2009 | Steinberg et al. |
| 7,606,417 | B2 | 10/2009 | Steinberg et al. |
| 7,620,218 | B2 | 11/2009 | Steinberg et al. |
| 7,783,085 | B2 | 8/2010 | Perlmutter et al. |
| 7,916,897 | B2 | 3/2011 | Corcoran et al. |
| 8,081,254 | B2 | 12/2011 | Nanu et al. |
| 8,199,222 | B2 | 6/2012 | Drimbarean et al. |
| 8,265,399 | B2 * | 9/2012 | Steinberg et al. ............. 382/216 |
| 2001/0041020 | A1 | 11/2001 | Shaffer et al. |
| 2002/0102024 | A1 | 8/2002 | Jones et al. |
| 2003/0133599 | A1 * | 7/2003 | Tian et al. ..................... 382/118 |
| 2003/0198368 | A1 * | 10/2003 | Kee ................................ 382/118 |
| 2004/0008258 | A1 | 1/2004 | Aas et al. |
| 2004/0052418 | A1 | 3/2004 | DeLean |
| 2004/0145660 | A1 | 7/2004 | Kusaka |
| 2004/0264780 | A1 | 12/2004 | Zhang et al. |
| 2006/0008150 | A1 | 1/2006 | Zhao et al. |
| 2006/0104488 | A1 | 5/2006 | Bazakos |
| 2006/0110014 | A1 | 5/2006 | Philomin et al. |
| 2006/0120599 | A1 | 6/2006 | Steinberg et al. |
| 2006/0140055 | A1 | 6/2006 | Ehrsam et al. |
| 2006/0140455 | A1 | 6/2006 | Costache et al. |
| 2006/0204110 | A1 | 9/2006 | Steinberg et al. |
| 2006/0239515 | A1 | 10/2006 | Zhang et al. |
| 2006/0251292 | A1 | 11/2006 | Gokturk et al. |
| 2006/0285754 | A1 | 12/2006 | Steinberg et al. |
| 2007/0011651 | A1 | 1/2007 | Wagner |
| 2007/0147820 | A1 | 6/2007 | Steinberg et al. |
| 2007/0195996 | A1 | 8/2007 | Kitamura |
| 2007/0269108 | A1 | 11/2007 | Steinberg et al. |
| 2008/0037827 | A1 | 2/2008 | Corcoran et al. |
| 2008/0037839 | A1 | 2/2008 | Corcoran et al. |
| 2008/0037840 | A1 | 2/2008 | Steinberg et al. |
| 2008/0043122 | A1 | 2/2008 | Steinberg et al. |
| 2008/0175481 | A1 | 7/2008 | Petrescu et al. |
| 2008/0219581 | A1 | 9/2008 | Albu et al. |
| 2008/0220750 | A1 | 9/2008 | Steinberg et al. |
| 2008/0266419 | A1 | 10/2008 | Drimbarean et al. |
| 2008/0316328 | A1 | 12/2008 | Steinberg et al. |
| 2009/0052750 | A1 | 2/2009 | Steinberg et al. |
| 2009/0080713 | A1 | 3/2009 | Bigioi et al. |
| 2009/0080797 | A1 | 3/2009 | Nanu et al. |
| 2009/0185753 | A1 | 7/2009 | Albu et al. |
| 2009/0189998 | A1 | 7/2009 | Nanu et al. |
| 2009/0190803 | A1 | 7/2009 | Neghina et al. |
| 2009/0196466 | A1 | 8/2009 | Capata et al. |
| 2009/0238419 | A1 | 9/2009 | Steinberg et al. |
| 2009/0244296 | A1 | 10/2009 | Petrescu et al. |
| 2009/0263022 | A1 | 10/2009 | Petrescu et al. |
| 2009/0273685 | A1 | 11/2009 | Ciuc et al. |
| 2010/0014721 | A1 * | 1/2010 | Steinberg et al. ............. 382/118 |
| 2010/0026831 | A1 | 2/2010 | Ciuc et al. |
| 2010/0141786 | A1 | 6/2010 | Bigioi et al. |
| 2010/0141787 | A1 | 6/2010 | Bigioi et al. |
| 2011/0081052 | A1 | 4/2011 | Bigioi et al. |
| 2012/0062761 | A1 | 3/2012 | Ianculescu et al. |
| 2012/0114198 | A1 * | 5/2012 | Yang et al. .................... 382/118 |
| 2012/0207358 | A1 * | 8/2012 | Blonk et al. ................... 382/118 |

FOREIGN PATENT DOCUMENTS

| | | | |
|---|---|---|---|
| WO | 2007/142621 | A1 | 12/2007 |
| WO | 2008/015586 | A2 | 2/2008 |
| WO | 2008/017343 | A1 | 2/2008 |
| WO | 2008/015586 | A3 | 8/2008 |
| WO | 2008/109622 | A1 | 9/2008 |
| WO | 2010/063463 | A2 | 6/2010 |
| WO | 2010/063463 | A3 | 7/2010 |

OTHER PUBLICATIONS

Y. Higashijima, S. Takano and K. Niijima. Face recognition using long Haar-like filters, in Proceedings of the Image and Vision Computing New Zealand 2005 (IVCNZ2005), pp. 43-48, 2005.

PCT Notification of Transmittal of the International Search Report and the Written Opinion of the International Searching Authority, or the Declaration, for PCT Application No. PCT/EP2009/008603, dated Jun. 7, 2010, 13 Pages.

PCT Notification of Transmittal of International Preliminary Report on Patentability Chapter I (IB/326), including the International Preliminary Report on Patentability, Chapter I (IB/373), for PCT Application No. PCT/EP2009/008603, dated Jun. 8, 2010, 10 Pages.

PCT Written Opinion of the International Search Authority, for PCT Application No. PCT/EP2009/008603, dated Jun. 5, 2010, 8 Pages.

Simon Clippingdale, Takayuki Ito: A unified approach to video face detection, tracking and recognition, Image Processing 1999. ICIP 99. Proceedings. 1999 International Conference on Kobe, Japan Oct. 24-28, 1999, Piscataway, NJ, USA,IEEE, US LNKD-DOI:10.1109/ICIP.1999.821718, vol. 1, Oct. 24, 1999, pp. 662-666, XP010369207 ISBN: 978-0-7803-5467-8.

G. Shakhnarovich and B. Moghaddam: Chapter 7. Face Recognition in Subspaces, in: Stan Z Li et al: Handbook of Face Recognition, Jan. 1, 2005, Springer, New York , XP002579601 ISBN: 9780387405957 Section 2.1.

Laurenz Wiskott, Jean-Marc Fellous, Norbert Krüger, Christopher Von Der Malsburg: Face recognition by elastic bunch graph matching, Image Processing, 1997. Proceedings., International Conference on Santa Barbara, CA, USA Oct. 26-29, 1997, Los Alamitos, CA, USA,IEEE Comput. Soc, US LNKD- DOI:10.1109/ICIP.1997. 647401, vol. 1, Oct. 26, 1997, pp. 129-132, XP010254125 ISBN: 978-0-8186-8183-7.

Gregory Shakhnarovich, Paul A. Viola, Baback Moghaddam: A unified learning framework for real time face detection and classification, Automatic Face and Gesture Recognition, 2002. Proceedings. Fifth IEEE International Conference on, IEEE, Piscataway, NJ, USA, May 20, 2002, pp. 16-23, XP010949330, ISBN: 978-0-7695-1602-8.

Bas Boom, Robin Van Rootseler, Raymond Veldhuis: Investigating the boosting framework for face recognition, Proceedings of the 28th Symposium on Information Theory in the Benelux, May 24, 2007, pp. 1-8, XP002579602, Enschede, NL.

Lubomir Bourdev, Jonathan Brandt: Robust Object Detection via Soft Cascade, Computer Vision and Pattern Recognition, 2005 IEEE Computer Society Conference on, IEEE, Piscataway, NJ, USA, LNKD-DOI: 10.1109/CVPR.2005.310, vol. 2, Jun. 20, 2005, pp. 236-243, XP010817525, ISBN: 978-0-7695-2372-9.

Vaishak Belle: Detection and Recognition of Human Faces using Random Forests for a Mobile Robot, [Online] Apr. 2008, pp. I-104, XP002579603 RWTH Aachen, De Master of Science Thesis Retrieved from the Internet: URL:http://thomas.deselaers.de/teaching/files/belle_master.pdf> [retrieved on Apr. 29, 2010].

Peter Corcoran, and Gabriel N. Costache, Combining PCA-based Datasets without Retraining of the Basis Vector Set, IEEE PC Jul. 24, 2007.

Jun Zhang, et al., Face Recognition: Eigenface, Elastic Matching, and Neutral Nets, Proceedings of the IEEE, vol. 85, No. 9, Sep. 1997, p. 1423-1435.

G. Costache, R. Mulryan, E. Steinberg, and P. Corcoran, In-camera person-indexing of digital images, Consumer Electronics, 2006, ICCE '06. 2006, Digest of Technical Papers, International Conference on Jan. 7-11, 2006 pp. 2.

Hall P., et al., Merging and Splitting Eigenspace Models, IEEE Transactions on Pattern Analysis and MachineIntelligence, IEEE Service Center, Los Alamitos, CA, US, vol. 22, No. 9, Sep. 1, 2000, pp. 1042-1049, XP008081056, ISSN: 0162-8828.

Hall, P., et al., Adding and subtracting eigenspaces with eigenvalue Decomposition and Singular Value Decomposition, Image and Vision Computing, Guildford, GB, vol. 20, No. 13-14, Dec. 1, 2002, pp. 1009-1016, XP008089613, ISSN: 0262-8856.

Hall, P., et al., Adding and Subtracting eigenspaces, Proceedings of the British Machine Vision Conference, vol. 2, Sep. 16, 1999, pp. 453-462, XP008089611.

Liu, X., et al., Eigenspace updating for non-stationary Process and its application to face recognition, Pattern Recognition, Elsevier, GB, vol. 36. No. 9, Sep. 1, 2003, pp. 1945-1959, XP004429544, ISSN: 0031-3203.

Corcoran, Peter, et al., Automated sorting of consumer image collections using face and peripheral region image classifiers, IEEE Transactions on Consumer Electronics, IEEE Service Center, New York, NY, US, vol. 51, No. 3, Aug. 1, 2005, pp. 747-754, XP008089612, ISSN: 0098-3063.

Javier Melenchon, et al., Efficiently Downdating, Composing and Splitting Singular Value Decompositions Preserving the Mean Information, Pattern Recognition and Image Analysis Lecture Notes in Computer Science, LNCS, Springer Berlin Heidelberg, BE, vol. 4478, Jan. 1, 1900, pp. 436-443, XP019060614, ISBN: 978-3-540-72848-1.

Patent Abstracts of Japan, publication No. 2001-283224, Face Collating Method, Recording Medium Stored with the Collating Method and Face Collator, published Oct. 12, 2001, 1 page.

Patent Abstracts of Japan, publication No. 2001-216518, Method and Device for Matching and Recording Medium, published Aug. 10, 2001, 1 page.

Patent Abstracts of Japan, publication No. 2006-259974, Image-Processing Method and Device, published Sep. 28, 2006, 1 page.

EPO Communication regarding the transmission of the European search report, European search opinion, and Supplementary European search report, for European patent application No. 08743677.0, report dated Feb. 14, 2011, 6 pages.

Jun Zhang, Yong Yan, and Martin Lades. Face Recognition: Eigenface, Elastic Matching, and Neural Nets. Proceedings of the IEEE, vol. 85, No. 9, Sep. 1997. pp. 1423-1435.

* cited by examiner

FACE RECOGNITION USING FACE TRACKER CLASSIFIER DATA

PRIORITY AND RELATED APPLICATIONS

This patent application claims priority to U.S. provisional patent application No. 61/120,289, filed Dec. 5, 2008.

FIELD OF INVENTION

The invention relates to face recognition within an image acquisition device.

BACKGROUND

The techniques of face detection and face recognition are each being explored by those skilled and a great many advances have been made in those respective fields in recent years. Face detection has to do with the problem of locating regions within a digital image or video sequence which have a high probability of representing a human face. Face recognition involves the analysis of such a "face region" and its comparison with a database of known faces to determine if the unknown "face region" is sufficiently similar to any of the known faces to represent a high probability match. The related field of tracking involves face or identity recognition between different frames in a temporal sequence of frames. A useful review of face detection is provided by Yang et al., in IEEE Transactions on Pattern Analysis and Machine Intelligence, Vol. 24, No. 1, pages 34-58, January 2002. A review of face recognition techniques is given in Zhang et al., Proceedings of the IEEE, Vol. 85, No. 9, pages 1423-1435, September 1997.

Face tracking for digital image acquisition devices includes methods of marking human faces in a series of images such as a video stream or a camera preview. Face tracking can be used for indication to the photographer the locations of faces in an image, improving the acquisition parameters, or for allowing post processing of the images based on knowledge of the location of faces.

In general, face tracking systems employ two principle modules: (i) a detection module for location of new candidate face regions in an acquired image or a sequence of images; and (ii) a tracking module for confirmed face regions.

A well-known fast-face detection algorithm is disclosed in US 2002/0102024 and at Rapid Object Detection Using a Boosted Cascade of Simple Features, in Proc. IEEE Conf. on Computer Vision & Pattern Recognition, 2001; (describing Haar-feature detection techniques). In brief, Viola-Jones first derives an integral image from an acquired image—usually an image frame in a video stream. Each element of the integral image is calculated as the sum of intensities of all points above and to the left of the point in the image. The total intensity of any sub-window in an image can then be derived by subtracting the integral image value for the top left point of the sub-window from the integral image value for the bottom right point of the sub-window. Also intensities for adjacent sub-windows can be efficiently compared using particular combinations of integral image values from points of the sub-windows.

In Viola-Jones, a chain (cascade) of 32 classifiers based on rectangular (and increasingly refined) Haar features are used with the integral image by applying the classifiers to a sub-window within the integral image. For a complete analysis of an acquired image this sub-window is shifted incrementally across the integral image until the entire image has been covered.

In addition to moving the sub-window across the entire integral image, the sub window must also be scaled up/down to cover the possible range of face sizes. In Violla-Jones, a scaling factor of 1.25 is used and, typically, a range of about 10-12 different scales are required to cover the possible face sizes in an XVGA size image.

It will therefore be seen that the resolution of the integral image is determined by the smallest sized classifier sub-window, i.e. the smallest size face to be detected, as larger sized sub-windows can use intermediate points within the integral image for their calculations.

A number of variants of the original Viola-Jones algorithm are known in the literature. These generally employ rectangular, Haar feature classifiers and use the integral image techniques of Viola-Jones.

Even though Viola-Jones is significantly faster than other face detectors, it still requires significant computation and, on a Pentium class computer can just about achieve real-time performance. In a resource-restricted embedded system, such as hand held image acquisition devices (examples include digital cameras, hand-held computers or cellular phones equipped with cameras), it is not practical to run such a face detector at real-time frame rates for video. From tests within a typical digital camera, it is only possible to achieve complete coverage of all 10-12 sub-window scales with a 3-4 classifier cascade. This allows some level of initial face detection to be achieved, but with unacceptably high false positive rates.

Census transform techniques are described at Froba, B. and Ernst, A., *Face detection with the modified census transform*, in *Automatic Face and Gesture Recognition, 2004; Sixth IEEE International Conference on,* 17-19 May 2004 Page(s): 91-96 of Proceedings.

Soft cascade techniques and use of cumulative probabilities are described at Bourdev, L. and Brandt, J., *Robust object detection via soft cascade*, in *Computer Vision and Pattern Recognition, 2005 (CVPR 2005). IEEE Computer Society Conference on,* Volume 2, Issue, 20-25 Jun. 2005 Page(s): 236-243 vol. 2.

Use of Haar-like filter for face recognition is described at Y. Higashijima, S. Takano and K. Niijima. *Face recognition using long Haar-like filters*, in *Proceedings of the Image and Vision Computing New Zealand* 2005 (IVCNZ2005), pp. 43-48, 2005.

The above-cited references, as well as all references cited below, and the background and brief description of the drawings section, and the drawings, are hereby incorporated by reference into the detailed description as providing alternative embodiments. In addition, U.S. Pat. Nos. 7,620,218, 7,606,417, 7,315,631, 7,469,071, 7,403,643, 7,362,368, 7,551,755, 7,558,408, 7,587,068, 7,555,148, 7,564,994, 7,317,815, 7,269,292, 7,315,630, 7,460,694, 7,466,866, 7,460,695 and 7,440,593; and United States published patent applications nos. 2009/0273685, 2009/0238419, 2009/0263022, 2008/0220750, 2009/0244296, 2009/0190803, 2009/0189998, 2009/0052750, 2009/0185753, 2009/0196466, 2009/0080797, 2009/0080713, 2008/0316328, 2008/0266419, 2008/0037840, 2008/0220750, 2008/0219581, 2008/0037839, 2008/0037827, 2008/0175481, 2008/0043122, 2007/0269108, 2007/0147820, 2006/0285754 and 2006/0204110; and U.S. patent application Ser. Nos. PCT/US2006/021393, 12/512,796, 12/374,020, 12/572,930, 12/191,304, 12/485,316, 12/479,593 are hereby incorporated by reference.

DETAILED DESCRIPTION OF THE EMBODIMENTS

Figure 1:
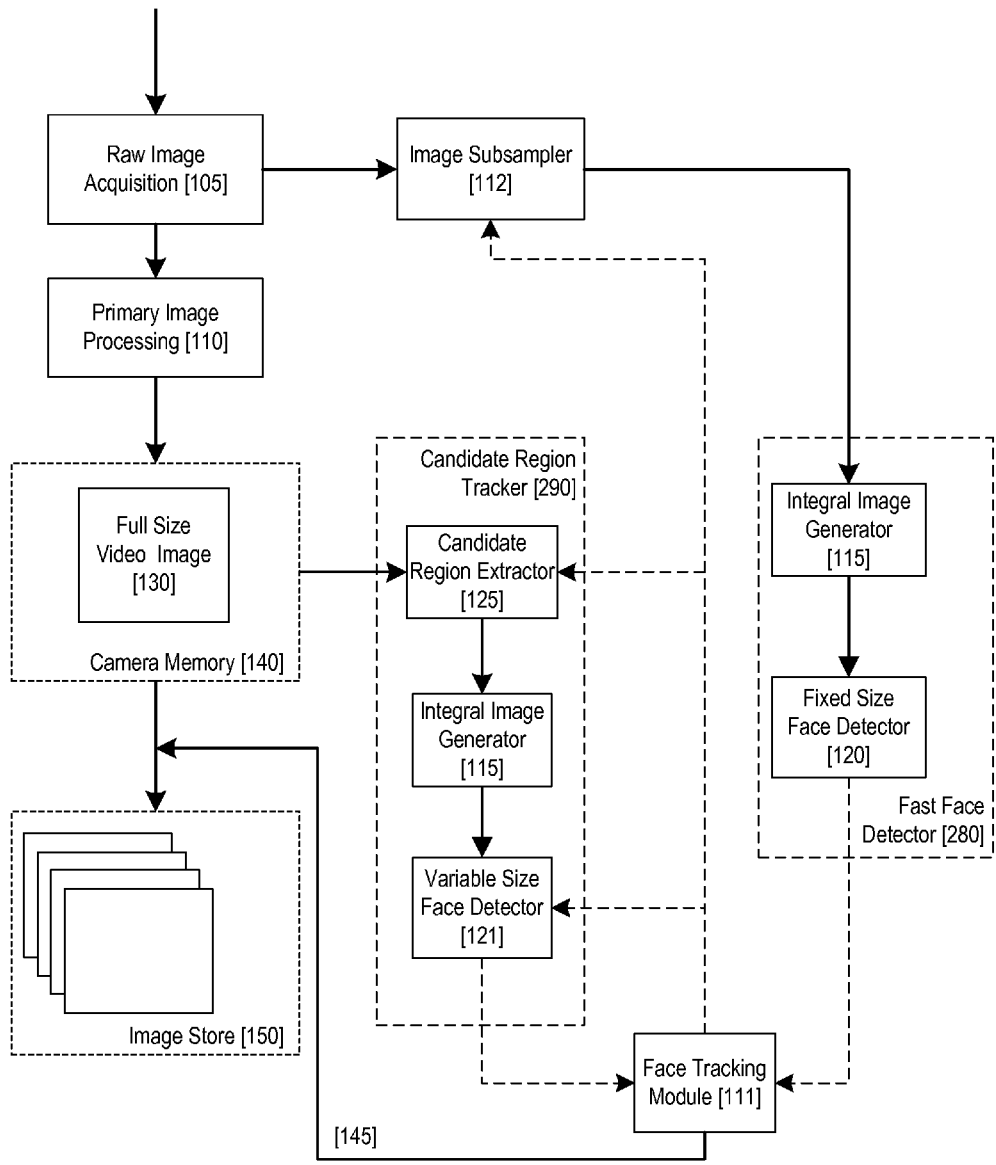
FIG. 1 illustrates in block form a face tracking system in accordance with certain embodiments.

Several embodiments are described which provide face recognition within an image acquisition device, such as a portable camera-enabled device, camera-phone, digital still camera or another device configured to capture digital images. The device may incorporate a face tracking subsystem. The system may train a set of recognizers to employ face detection classifiers to perform face recognition in parallel.

Certain embodiments are based on using the haar/census classifiers from a face Tracker subsystem to train a number of person-specific face recognizer subsystems. These face recognizers can then be run in parallel with a face tracking process to provide real-time probabilities that a tracked face belongs to each recognition class. When the probability for one face recognition class is significantly higher than all the others a positive recognition is reported; when two (or more) classes have high and approximately equal probabilities user input is requested; when all classes have low and approximately equal probabilities an unknown recognition class is reported and the user may choose to train the system for this unknown class.

Several embodiments are described which are applicable to imaging appliances which employ a classifier-cascade based face detection process (hardware/software/hybrid) similar to that originally described by Violla-Jones —prior art document (I); this can be employed to implement a real-time face tracking process, e.g., as described at U.S. Pat. Nos. 7,403,643 and 7,315,631 among others cited above in the Related Art section.

An advantageous process is described to enable (a) the training of a plurality of face recognizers based on the face detector classifiers; and (b) the real-time recognition of tracked face regions using the same set of classifiers employed for face detection/tracking.

A face detector sub-process is used which combines both Haar-type classifiers described in prior art document (i) with census-type classifiers described in prior art document (ii). In addition this detector also employs the soft-cascade techniques described in prior art document (iii). These enable a cumulative probability to be generated at each stage of the cascade, rather than the binary reject/continue event which occurred at each stage of the cascade in the original VJ technique described in prior art document (i). The significance of the soft cascade technique is described below.

Embodiments are described including the use of Haar classifiers for face recognition and the use of the same set of classifiers which were trained for the face detector to also perform as face recognition classifiers. This involves a training step in certain embodiments, which subsequently enables a recognition process to be implemented in parallel with a normal face detection/tracking process. Advantages of this include that statistical data for face recognition can be gathered at the same time as a face tracking process is running and where a suitable hardware embodiment is available there is practically no additional computational requirement over that involved in the tracking process.

A method is provided for in-camera recognition of a specific face within a digital image as part of an acquisition process. A portable digital image acquisition device includes a lens, an image sensor, and a processor programmed by processor-readable code. The device is configured to acquire digital images, such as a camera-phone, digital still camera, or any other camera-enabled mobile device. A sequence of relatively low resolution images including a face are generated in the device, captured by the device or otherwise obtained in the device. Groups of pixels are identified that correspond to the face within multiple relatively low resolution images. The face is tracked within the multiple relatively low resolution images. Multiple real-time probabilities are determined as to whether the face corresponds to a specific person within the multiple images. The multiple real-time probabilities are averaged to obtain a cumulative probability that the face belongs to the specific person. When the cumulative probability exceeds a predetermined threshold, a workflow is initiated, and/or one or more image processing or other pre- or post-image acquisition actions is/are taken on the portable digital image acquisition device based on the recognition of the face as belonging to the specific person.

The initiating may include displaying a name or other identifier of the specific person recognized in association with the face on a display of the portable image acquisition device.

The method may include repeating the process for multiple different persons, and wherein when the cumulative probability of a particular face belonging to a second specific person is below the predetermined threshold by less than a predetermined amount, but exceeds that for any other specific person, then a workflow may be initiated and/or image processing or other pre- or post-image acquisition action may be performed on the portable digital image acquisition device based on the recognition of the face as belonging to the second specific person.

The method may also include repeating the process for multiple different persons, and wherein when the cumulative probability of a particular face belonging to any of the specific person or the multiple different persons is below the same or a different threshold, then the face may be identified as unknown.

The method may include repeating the process for multiple different persons, and wherein when the cumulative probabilities of a particular face belonging to two or more of the specific person and the multiple different persons is above the threshold, then the face may be identified as being associated jointly with the two or more persons.

The method may include training a set of face recognition classifiers associated with the specific person. The determining of the real-time probabilities may include using the face recognition classifiers, which may include census-type classifiers or Haar-type classifiers, or both. The face recognition classifiers may include classifiers also used in the tracking and/or identifying of the face.

The face tracking may be performed in parallel with determining whether the identified face corresponds to the specific person.

Another method is provided for recognizing a face within an image. A lens, image sensor and processor of a portable digital image acquisition device may be used to acquire a digital image and to recognize one or more faces appearing within the digital image. At least one facial region may be determined within an image. A multi-classifier face detector may be used to determine that a probability of the at least one facial region containing a face is above a threshold probability. Probability values may be determined for a set of classifiers for the at least one facial region to provide a recognition profile. The at least one facial region may be determined within the image by determining a value of at least one classifier of the set. The recognition profile may be compared against a predetermined recognition profile to determine a degree of match.

The method may also include adjusting one or more classifiers based on the determining of the at least one facial region based on the value of the at least one classifier of the set being used in the determination of the recognition profile. The adjusting may include determining an adjustment based on an amount by which the value of the at least one classifier exceeds the threshold probability for the at least one facial region to contain the face.

The recognition profile may include a first recognition profile. The method may further include determining values for a second set of classifiers for the face to determine a second recognition profile. The determining of at least one facial region may include determining multiple values for the second set of classifiers. The second recognition profile may be compared against a second predetermined recognition profile to determine a degree of match. One of the first and second recognition profiles may be selected as providing a better degree of match. The determining at least one facial region may include determining the multiple values for determining the second recognition profile, and determining multiple classifiers, and at least one of the multiple classifiers may differ from the at least one classifier of the set of classifiers of the first recognition profile.

Another method is provided for in-camera face recognition training of a specific face within digital images acquired with a portable camera-enabled device. A lens, image sensor and processor of a portable camera-enabled device may be used to acquire digital images. Multiple different images that include a face of a specific person are generated in the device, captured or otherwise obtained in the device. Groups of pixels are identified that correspond to the face within the multiple different images. Sets of classifiers are selected as matching the faces identified in the multiple different images. The sets of classifiers are statistically analyzed to generate a reference classifier profile of the face associated with the specific person. The method may include repeating the aforementioned generating, identifying, selecting and statistical analysis one or more times to generate one or more further reference classifier profiles of the face associated with the specific person. The multiple reference classifier profiles are normalized to determine normalized face classifiers of an average face associated with the specific person. A face recognition profile is generated for the specific person based on the normalized face classifiers of the average face of the specific person. The method may further include programming the processor such that when a probability exceeds a predetermined threshold that an identified face corresponds to the specific person associated with the face recognition profile, then the processor initiates a workflow, image processing or other pre- or post-image acquisition action on the portable camera-enabled device based on the recognition of the face as belonging to the specific person.

The different images may include two or more different poses and/or different lighting conditions of the face.

The statistical analysis may involve determining mean and variance values for the sets of classifiers.

The method may include tracking the face within the plurality of the relatively low resolution images. The selecting may include aligning face region subwindows and determining probabilities for classifiers based upon which the sets of classifiers are selected. The tracking may be performed in parallel with determining whether the identified face corresponds to the specific person.

The method may include determining probabilities for classifiers based upon which the sets of classifiers are selected.

Another method is provided for determining face recognition profiles for each of a group of at least two persons, including analyzing a set of images where more than one face image of each person is available. The method includes determining with a multi-classifier face detector that a face region within a digital image has above a threshold probability of corresponding to a first person of a group of persons. A probability score is recorded for each classifier stage of the multi-classifier face detector, along with an overall probability score, and the probability scores are associated with the first person. These two steps are repeated for one or more further images each containing a face region that has above the threshold probability of corresponding to the first person. The probability scores for each classifier and the overall probability score are analyzed, and a mean and variance are determined for each classifier for the first person. These steps are repeated for one or more further persons of the group of persons. A sub-set of classifiers is determined to best differentiate between the first person and the one or more further persons of the group. The sub-set of classifiers is stored, and associated with the first person as a recognition profile.

The method may include deriving the one or more further images each containing a face region of the first person from a set of preview stream images acquired within a same digital imaging device as the digital image.

The mean and variance may be stored for each classifier, as well as the overall probability score. These may be associated with the first person as a base recognition profile. The method may include determining and storing base recognition profile data for the one or more further persons of the group of persons, determining a new sub-set of classifiers which best differentiates the first person from the one or more further persons, and storing the new sub-set of classifiers as a new recognition profile for the first person, including associating the new sub-set of classifiers with the first person. The method may also include deriving multiple face images of the first person from a set of preview stream images, and determining the base recognition profile on these multiple face images from the set of preview stream images. The method may also include storing the base recognition profile of the first person and the base recognition profile data of the one or more further persons of the group of persons within a same digital imaging device used to capture the digital image and set of preview stream images.

One or more processor-readable storage media are also provided that have code embedded therein for programming a processor to perform any of the methods described herein.

A digital image acquisition device is also provided that is capable of real-time in-camera recognition of a specific face within a digital image as part of an acquisition process. The device includes a lens and an image sensor to acquire digital images including sequences of relatively low resolution images, as well as a processor programmed by processor-readable code embedded within one or more digital storage media. The processor-readable code include a face detector component to program the processor to identify a groups of pixels that correspond to the face within one or more of the relatively low resolution images; a face tracker component to program the processor to track said face within a plurality of the relatively low resolution images; and a face recognition component to program the processor to determine multiple real-time probabilities that the face corresponds to a specific person within the plurality of the low resolution images, and to average the multiple real-time probabilities to obtain a cumulative probability that the face belongs to the specific person. The processor is configured to determine that the cumulative probability exceeds a predetermined threshold. The processor is further programmed to initiate a workflow, image processing or other pre- or post-image acquisition action, or combinations thereof, on the portable digital image acquisition device based on the recognition of the face as belonging to a specific person.

A portable camera-enabled device is also provided that is capable of in-camera face recognition and face recognition training of a specific face within acquired digital images. The device includes a lens and an image sensor to acquire digital images, and a processor programmed by processor-readable code embedded within one or more digital storage media. The processor-readable code includes a face detector component to program the processor to identify a groups of pixels that correspond to a face within the digital images, and a face recognition training component to program the processor to generate a face recognition profile for a specific person determined by programming the processor to perform the following: selecting sets of classifiers as matching the faces identified in the multiple different images; statistically analyzing the sets of classifiers to generate a reference classifier profile of the face associated with the specific person; repeating the generating, identifying, selecting and statistically analyzing one or more times to generate one or more further reference classifier profiles of the face associated with the specific person; and normalizing the reference classifier profiles to determine normalized face classifiers of an average face associated with the specific person. The device further includes a face recognition component to determine when a probability exceeds a predetermined threshold that an identified face corresponds to the specific person associated with the face recognition profile, and to initiate a workflow, image processing or other pre- or post-image acquisition action on the portable camera-enabled device when the face belonging to the specific person is thereby recognized.

These devices may be configured to perform any of the methods described herein.

A digital image acquisition device is also provided that is capable of in-camera recognition of a face within a digital image as part of an acquisition process, and having a lens, image sensor and processor programmed to perform any of the methods described herein.

The Face Tracker

Exemplary face tracking techniques are described in U.S. Pat. Nos. 7,315,631, 7,403,643, 7,460,695, 7,460,694, and 7,469,055, which are assigned to the same assignee and incorporated by reference. FIG. 1 illustrates a face tracking system according to certain embodiments. The solid lines indicate the flow of image data. The dashed line indicates control inputs or information outputs (e.g. location(s) of detected faces) from a module. In this example, an image processing apparatus can be a digital still camera (DSC), a video camera, a cell phone equipped with an image capturing mechanism, or a camera-phone, or a hand-held computer equipped with an internal or external camera.

Referring to the example of FIG. 1, a digital image is acquired in raw format from an image sensor (CCD or CMOS) [105] and an image subsampler [112] generates a smaller copy of the main image. The camera-enabled portable device may include a dedicated hardware subsystem to perform image subsampling, for example, to provide preview images to a camera display. The subsampled image may be provided in bitmap format (RGB or YCC). In the meantime, the normal image acquisition chain performs post-processing on the raw image [110] which may include some luminance and color balancing. In certain digital imaging systems, the subsampling may occur after such post-processing, or after certain post-processing filters are applied, but before the entire post-processing filter chain is completed.

The subsampled image is next passed to an integral image generator [115] which creates an integral image from the subsampled image. This integral image is next passed to a fixed size face detector [120]. The face detector is applied to the full integral image, but as this is an integral image of a subsampled copy of the main image, the processing involving the face detector is proportionately reduced. If the subsample is ¼ of the main image, this implies the processing time involved is only 25% of that for the full image.

This approach is particularly amenable to hardware embodiments where the subsampled image memory space can be scanned by a fixed size DMA window and digital logic to implement a Haar-feature classifier chain can be applied to this DMA window. However, the use of several sizes of classifier (in a software embodiment) is not precluded, nor is the use of multiple fixed-size classifiers (in a hardware embodiment). An advantage is that a smaller integral image may be calculated.

Still referring to FIG. 1, after application of the fast face detector [280] any newly detected candidate face regions [141] are passed onto a face tracking module [111] where any face regions confirmed from previous analysis [145] are merged with the new candidate face regions prior to being provided [142] to a face tracker [290].

The face tracker [290] provides a set of confirmed candidate regions [143] back to the tracking module [111]. Additional image processing filters are applied by the tracking module [111] to confirm either that these confirmed regions [143] are face regions or to maintain regions as candidates if they have not been confirmed as such by the face tracker [290]. A final set of face regions [145] can be output by the module [111] for use elsewhere in the camera or to be stored within or in association with an acquired image for later processing either within the camera or offline; as well as to be used in the next iteration of face tracking.

After the main image acquisition chain is completed a full-size copy of the main image [130] will normally reside in the system memory [140] of the image acquisition system. This may be accessed by a candidate region extractor [125] component of the face tracker [290] which selects image patches based on candidate face region data [142] obtained from the face tracking module [111]. These image patches for each candidate region are passed to an integral image generator [115] which passes the resulting integral images to a variable-sized detector [121], as one possible example a VJ detector, which then applies a classifier chain, preferably at least a 32 classifier chain, to the integral image for each candidate region across a range of different scales.

The Soft Cascade and Cumulative Probability

In certain embodiments, both fixed [120] and variable [121] face detectors are based on a hybrid cascade which employs both haar and census classifiers. These may be combined to generate a cumulative probability according to one or more soft cascade techniques. An advantage of the soft cascade technique is that a face candidate may marginally fail a number of individual classifiers in a cascade, but if its overall probability remains above a cumulative probability threshold, then it is still retained as a confirmed face region. An example of cumulative probabilities generated by several face candidates is illustrated in FIG. 2, which illustrates example plots of strong, weak and average face candidates compared with a baseline face threshold.

Figure 2:
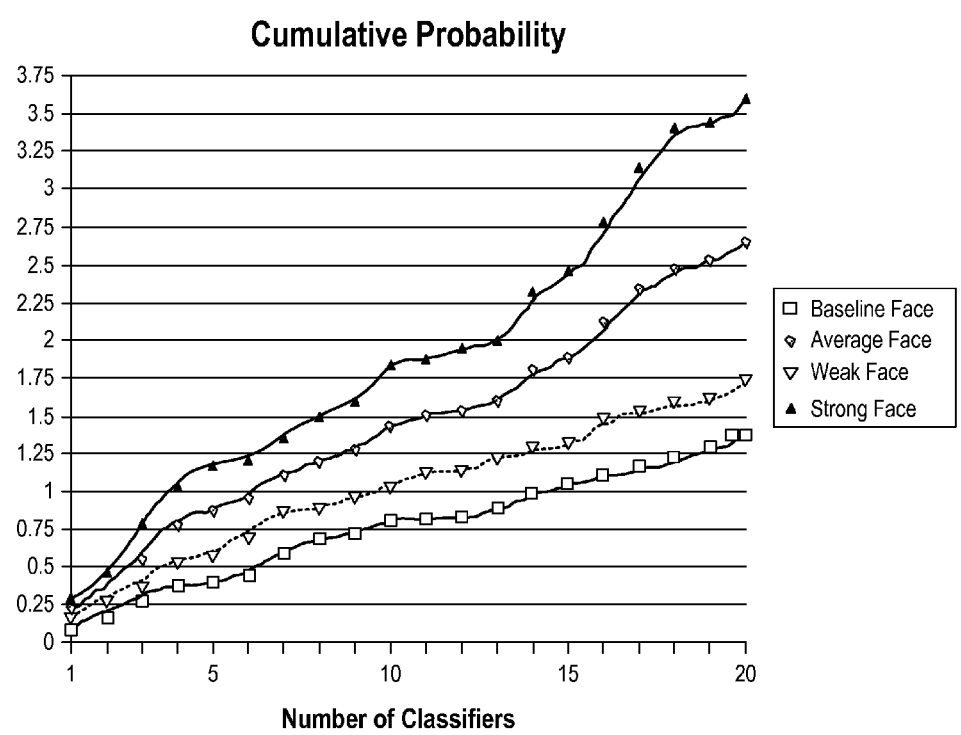
FIG. 2 shows example plots of cumulative probabilities versus numbers of classifiers for strong, weak and average face candidates compared to a baseline face threshold.

FIG. 2 illustrates three different cases of face candidates compared to a baseline face probability. A candidate window which returns a cumulative score which remains above this baseline threshold is considered to be correctly detected as a face region. Some faces can wander very close to this threshold as illustrated by the "weak" candidate trace. Other candidates will return significantly higher cumulative probabilities and may be considered as "strong" candidates. It is also possible as part of the training process for the face detector to determine the "average" probability trace returned over more than one sample, some fraction of a training set, or even over an entire training set, which may typically include 50,000+ training samples.

The Classifier Cascade

Figure 3:
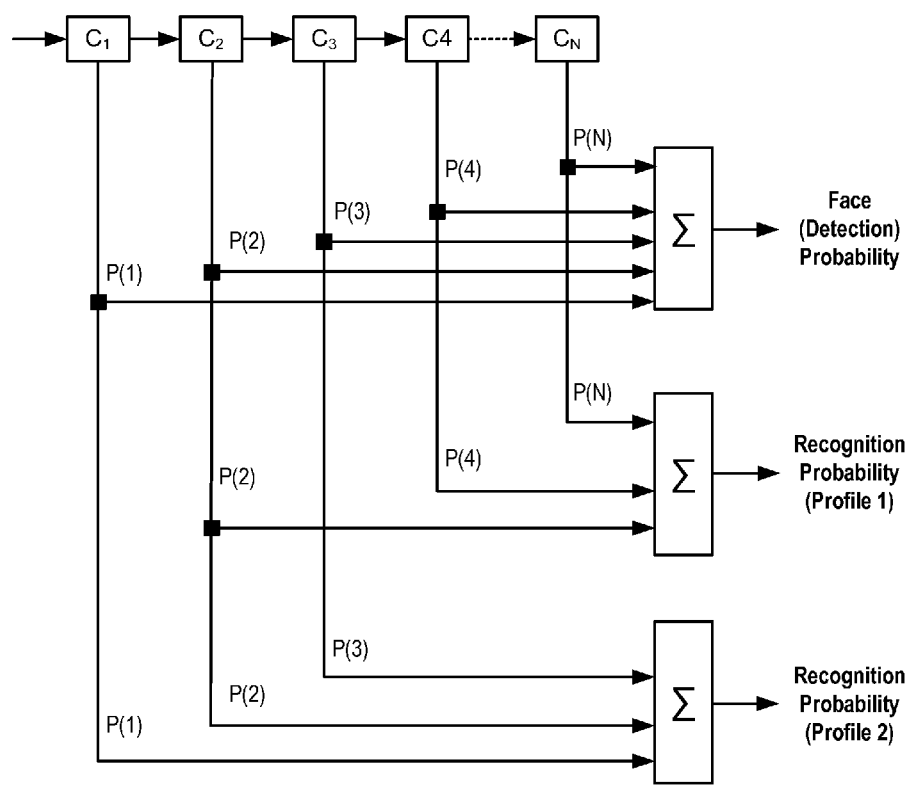
FIG. 3 illustrates a classifier cascade employed for both face detection and face recognition in accordance with certain embodiments.

A classifier cascade in accordance with certain embodiments is illustrated in FIG. 3. Individual classifier stages are indicated as $C_1, C_2, C_3, C_4, \ldots, C_N$. The classifier cascade illustrated at FIG. 3 may be used for both face detection and face recognition. The input is a candidate sub-window extracted from a main image. This sub-window is passed through each classifier stage and generates a probability output from that stage—$P(1)$, $P(2)$, etc—which are then summed to generate a cumulative face detection probability output for that candidate region. In some embodiments, these probabilities may be summed sequentially, enabling a probability output after the sub-window passes through each classifier stage. This enables a comparison and decision to be taken at each stage, thus eliminating non-face candidates more quickly; in a hardware embodiment there are some advantages to parallelization of this process and consequently there will be fewer decision stages at which candidates may be rejected—typically less than 4 in a 32 classifier cascade.

In the example of FIG. 3, it is illustrated how multiple recognition class probabilities may be generated from the same classifier probabilities—$P(1), P(2)$, etc—as are used for the detector process. In the illustrative example in FIG. 3, it can be seen that one recognition class employs $P(1), P(2)$ and $P(3)$, whereas a different recognition class employs $P(2), P(4)$ and $P(N)$ to generate their output probabilities.

The Training Process

The classifier combinations employed to generate these recognition probabilities may be determined from a fixed set of detector classifiers in accordance with an advantageous training process as described herein. In accordance with certain embodiments, classifiers are selected from a main detector cascade, and these classifiers are employed to generate a probability value that a tracked face matches a known person. This selection of particular classifiers is referred to hereinafter as a recognition profile (RP) for a known or specific person. In order to determine a recognition profile, the technique involves tracking the person for whom it is desired to create the RP. A suitable UI may be integrated into a digital imaging device for this purpose.

Figure 4A:
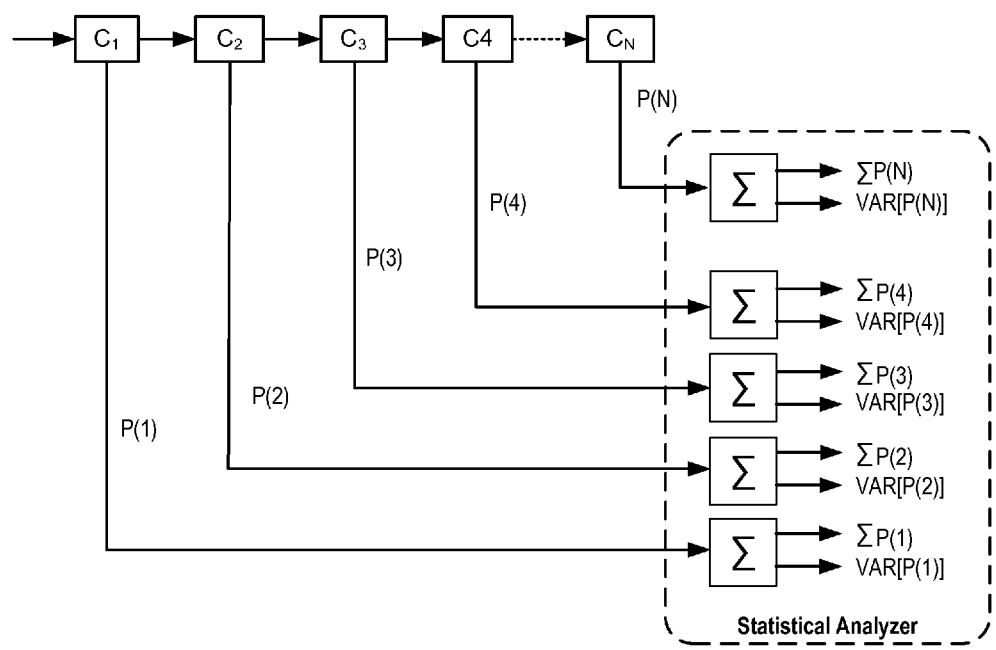
FIG. 4a illustrates a statistical analysis process for face detector classifiers in accordance with certain embodiments.

According to certain embodiments, the user of an imaging appliance may activate an embedded face tracker. When the face tracker locks onto a person, they activate a training mode, indicating at the same time that the locked face region is a reference face region. In this mode, the tracker operates as normal, displaying a rectangular window around one or more detected faces in the image stream. But, in addition to this feature in certain embodiments, the tracker sends additional data from the tracked reference face to an additional subsystem. In particular, probability outputs from each classifier applied to the optimally aligned face region subwindow are sent to a statistical analyzer, for example, as shown at FIG. 4a which illustrates a statistical analysis process for face detector classifiers. This records a classifier probability output over a sequence of main image frames. If the training is successful, then mean and variance values are output for each classifier in the main detector cascade. This process is designed to obtain sufficient statistical data to reliably determine a reference classifier profile.

Training may not complete successfully for various reasons. During the training process, it is desirable for a person to move their face into different, substantially frontal, poses and ideally to move between different lighting conditions. In doing this, the face tracker may lose its lock on a person's face such that the training process is repeated from the beginning, although a lock may be lost temporarily and re-established (see U.S. Ser. No. 12/572,930, which is incorporated by reference). In some cases, variations in pose and illumination may be too extreme and the statistical analysis may not converge to reliable mean and variance values for each classifier in the cascade. Where training is not successfully completed, a warning is issued to the user and the resulting statistical data is considered unreliable and is purged from the analyzer subsystem.

Where each classifier does converge to a reliable mean and variance, the resulting statistical data is then stored as a reference classifier profile (RCP) for that known or specific person. This classifier profile is distinct from the recognition profile which will eventually be determined for that person in accordance with certain embodiments.

Figure 4B:
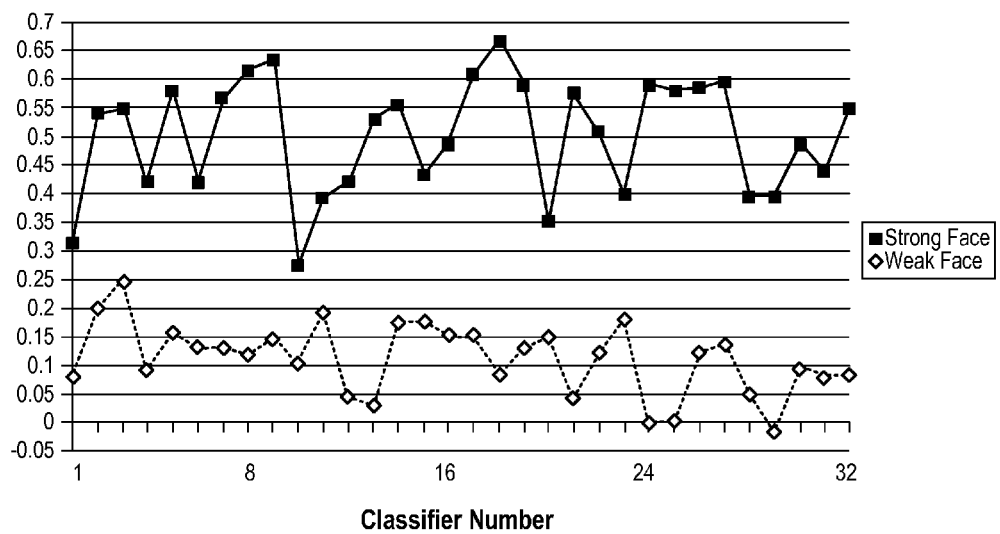
FIG. 4b illustrates by way of example a comparison of reference classifier profiles for relatively strong and weak face regions.

Two examples of reference classifier profiles are provided by example at FIG. 4b which illustrates comparison of reference classifier profiles for relatively strong and weak face regions. Both are normalized with respect to the baseline face threshold, for example, the baseline classifier value may be subtracted from the corresponding classifier of each of these reference profiles in a normalization process in accordance with certain embodiments. One of the examples illustrated in FIG. 4b is of a relatively strong face region which has a high cumulative probability of being a face as determined by the main face tracker. A second example illustrated at FIG. 4b is of a relatively weak face region where the cumulative probability is close to the baseline face threshold and most classifiers have low probability outputs (some may be zero, or may even have negative probability depending on the type of classifier employed in the detector cascade).

Although both face regions are valid faces, it is clear that it will be impractical to distinguish between the two as the probability outputs of the strong face will swamp those of the weak one. Thus, a process in accordance with certain embodiments involves some means to normalize across different types of face regions.

Referring back briefly to FIG. 2, the cumulative probability trace of an average face will be known in certain embodiments from the training of the classifier cascade for main face detector. A cumulative probability total will be known in certain embodiments for the average face. A cumulative probability total can also be calculated from the two illustrative reference classifier profiles provided above, for example. In this example the cumulative probability per classifier (CPPC) of the average face over the 32 classifier cascade is 0.39 and the CPPC values for the strong face example is 0.50 and for the weak face is 0.11 over a 32 classifier cascade.

A simple normalization can now be achieved by adjusting the strong face CPPC value down and the weak face CPPC value up so both match that of the average face. This can be simply achieved by adjusting the probability of each classifier as illustrated in a normalization block at FIG. 5 and as follows:

$$P_{adjust}(C_N) = P(C_N) + (CPPC_{RCP} - CPPC_{Average\ Face})$$

Figure 4C:
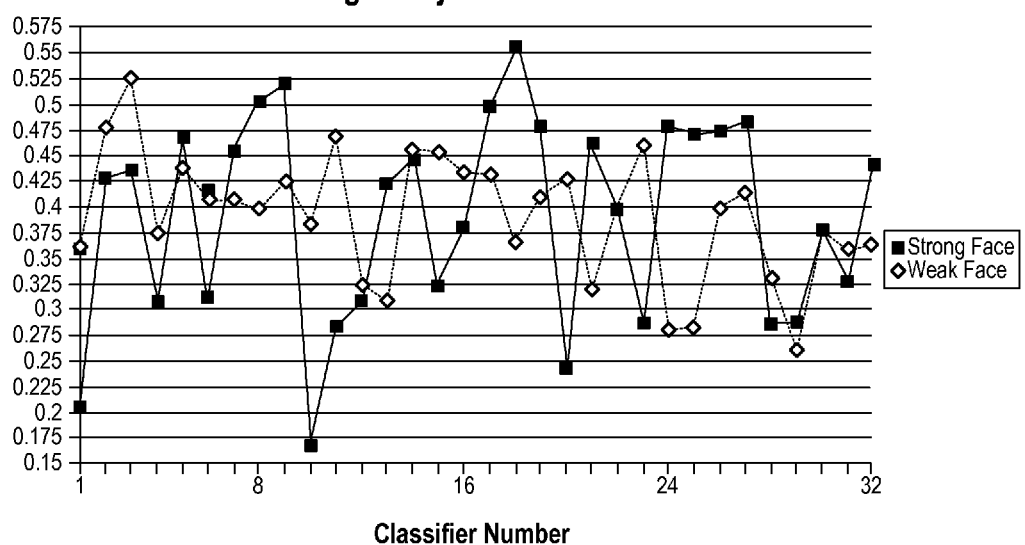
FIG. 4c illustrates by way of example adjusted strong and weak face classifier profiles normalized to an average face profile.

Thus for each classifier, the probability is increased by the difference between the CPPC value for this reference classifier profile and the CPPC value for the average face across the training set for the main face detector. This leads to the adjusted RCP for both strong and weak faces as illustrated in FIG. 4c which shows two examples of adjusted RCPs including adjusted strong and weak faces normalized to the average face. In certain embodiments, the classifier probabilities are adjusted according to the mean value of the average face. In other embodiments, the process involves matching RCP variances between training samples.

Each data point is FIG. 4c represents the mean probability of that classifier for a particular known or specific person's face. The variance is not shown explicitly in FIG. 4c, but it may be typically of the order of +/−0.025 or less (or one vertical grid-line in the diagram). From FIG. 4c, it can be observed that some of the adjusted classifiers now provide higher probability for the weak face region, for example, classifier nos. 2, 3, 4, 6, 10, 11, 15, 16, 20 and 23 generate significantly higher probabilities for the weaker face region over the strong face region. After the adjustment process, the stored RCP is replaced by its adjusted equivalent and retained as the RCP for that particular person's face. Now that a normalization technique has been described in accordance with certain embodiments, a sub-cascade of normalized face classifiers may be selected to provide a recognition profile (RP) for a current face region that is being trained.

Another example includes a case where no RPs have been created and only a single adjusted RCP (ARCP) has been created and saved for a current face. As there are not other RPs against which the current face can be compared, then the process involves selecting the best classifiers from the RP for the current face. In certain embodiments, a threshold probability is selected. This may be estimated based on empirical calibration or alternatively a range may be employed. The user of the camera may adjust this threshold manually. For the case of the weak face, as illustrated for example at FIG. 4c, and assuming a recognition threshold of 2.0, a sufficient number of the highest probability classifiers may be selected to provide, e.g., at least a 30% margin of error or other selected margin or error. In this example, choosing classifiers 2, 3, 11, 23, 14, and 15 gives a cumulative probability of 0.475+0.525+0.475+0.46+0.455+0.455=2.85. This is in fact more than 30%, but such ensures with greater reliability that a face is recognized even if conditions are not ideal. Once the recognition cascade achieves a cumulative value of 2.0 or greater, then this face will be successfully recognized.

When a second ARCP is added, the first RP will be reviewed/retrained in accordance with certain embodiments. In the example above, an RP is constructed for the strong face. This may include higher-valued classifiers 18, 9, 8, 17, and 19 giving a cumulative probability of 0.55+0.525+0.5+0.5+0.475=2.55. Optionally another, weaker, classifier could be added to increase the expected output probability to match that of the first RP. In this case, one of classifiers 4, 6, or 12 may be chosen to complete the cascade.

In this example, the chosen classifiers, in addition to being the highest valued classifiers for the current face are also well separated in probability from the same classifiers for the other face. As more profiles are added, this will generally not be the case and it will become more difficult to choose higher-probability classifiers which are not common with other RPs. To overcome this, averaged ARCP (AARCP) may be formed in certain embodiments by summing and averaging the ARCPs for each face with a stored ARCP and associated RP. After two or more ARCPs are stored, an AARCP is created and the RP for each face is refined. Classifiers are now selected based not only on their overall probability, but also according to the criteria that they have a probability which is greater than the corresponding classifier of the AARCP by an amount equal to at least the variance (or a multiple thereof) of that classifier. If sufficient classifiers that meet these criteria are not found or cannot be found, then a face profile may be returned as untrainable. In this case, the user may delete one or more existing face profiles (specifically the corresponding ARCPs and RPs) to facilitate the addition of a new RP. In some embodiments, a fixed number of faces may be permitted to reduce the likelihood of untrainable faces being encountered.

The Recognition Process

Figure 5:
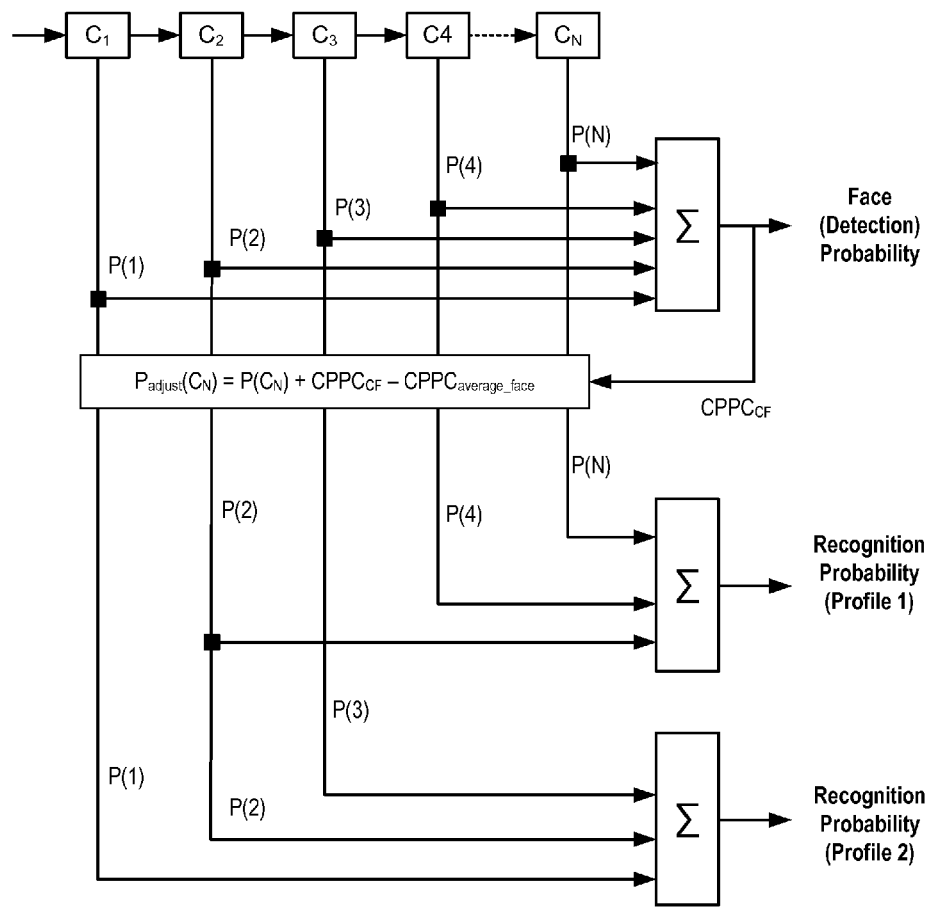
FIG. 5 illustrates real-time detection and recognition processes in accordance with certain embodiments.

Once several RPs have been created, the imaging appliance can now perform real-time recognition according to the example process illustrated in FIG. 5 in certain embodiments. FIG. 5 illustrates a process of real-time face detection and face recognition. The process of FIG. 5 includes features of the process illustrated at FIG. 3, where one or more of the same classifiers used in the detection process are also used in the recognition process. FIG. 5 further illustrates an additional normalization block provided to adjust the probabilities of the individual recognition classifiers for a currently tracked face according to a cumulative (detection) probability of the current face.

A recognition decision may be made based on one of the output recognition probabilities being significantly higher than all other output probabilities, and/or being above a pre-determined recognition threshold—2.0 in our illustrative example. In certain cases a face may still be reported as recognized if it is slightly or somewhat below the threshold (for example, up to 20% below), but its recognition probability is still significantly or some predetermined amount greater than any other output recognition probability.

Where two or more faces have approximately similar probabilities, and are greater than the predetermined recognition threshold (or are slightly below it, but where their recognition probabilities are still significantly greater than any other output recognition probability), then these two, or more, faces may be reported as a joint recognition (and optionally a user may select and/or de-select). Where all recognition probabilities are significantly below a recognition threshold, for example, more than 20%, 30%, 40%, or 50%, the face may be reported as unknown. Other settings may be applied for controlling the recognition process either as installed rules, or as may be selected by a user manipulating pull-down menus or other UI.

As these recognition probabilities are generated on a real-time basis, for example, a new set may be available for a tracked face region every 1-2 frames of a preview image stream, then they may be advantageously summed and statistical methods can accumulate a greater degree of confidence that a particular face is correctly recognized. In particular, where a face is tracked and successfully recognized over a period of time, it can continue to be recognized even where the recognition probability falls below a threshold (or another recognition probability becomes higher), and the main face-tracking lock is retained.

In the same way, a face may not immediately display a recognized status, but the camera may wait until a sufficient number of successful recognitions are achieved before returning a recognized status and identifying the known or otherwise specific person.

A face recognition process may be implemented in a digital imaging appliance with a face tracking/detection subsystem using existing detection classifiers to perform face recognition.

This provides a lightweight in-camera method of performing face recognition and for training a camera or camera-phone or other camera-enabled device to recognize different people.

All references cited above are incorporated by reference as disclosing alternative embodiments.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

In addition, in methods that may be performed according to embodiments and claims described herein, the operations have been described in selected typographical sequences. However, the sequences have been selected and so ordered for typographical convenience and are not intended to imply any particular order for performing the operations, unless a particular ordering is expressly indicated as being required or is understood by those skilled in the art as being necessary.

What is claimed is:

1. A method of in-camera face recognition training of a specific face within digital images acquired with a portable camera-enabled device, comprising:
   using a lens, image sensor and processor of a portable camera-enabled device to acquire digital images;
   generating in the device, capturing or otherwise obtaining in the device multiple different images that include a face of a specific person;
   identifying groups of pixels that correspond to the face within the multiple different images;
   selecting sets of classifiers as matching the faces identified in the multiple different images;
   statistically analyzing the sets of classifiers to generate a reference classifier profile of the face associated with the specific person;
   repeating the generating, identifying, selecting and statistically analyzing one or more times to generate one or more further reference classifier profiles of the face associated with the specific person;
   normalizing the reference classifier profiles to determine normalized face classifiers of an average face associated with the specific person;
   generating a face recognition profile for the specific person based on the normalized face classifiers of the average face of the specific person; and
   programming the processor such that when a probability exceeds a predetermined threshold that an identified face corresponds to the specific person associated with the face recognition profile, then the processor initiates a workflow, image processing or other pre- or post-image acquisition action on the portable camera-enabled device based on the recognition of the face as belonging to the specific person.

2. The method of claim 1, wherein the different images comprise two or more different poses of the face.

3. The method of claim 2, wherein the different images comprises two or more different lighting conditions of the face.

4. The method of claim 1, wherein the different images comprises two or more different lighting conditions of the face.

5. The method of claim 1, wherein the statistically analyzing comprises determining mean and variance values for the sets of classifiers.

6. The method of claim 1, further comprising tracking said face within the plurality of the relatively low resolution images.

7. The method of claim 6, wherein the selecting comprises aligning face region subwindows and determining probabilities for classifiers based upon which the sets of classifiers are selected.

8. The method of claim 6, wherein the tracking is performed in parallel with determining whether the identified face corresponds to the specific person.

9. The method of claim 1, further comprising determining probabilities for classifiers based upon which the sets of classifiers are selected.

10. A portable camera-enabled device capable of in-camera face recognition and face recognition training of a specific face within acquired digital images, comprising:
   a lens and an image sensor to acquire digital images;
   a processor programmed by processor-readable code embedded within one or more digital storage media, wherein the processor-readable code comprises:
      a face detector component to program the processor to identify a groups of pixels that correspond to a face within the digital images;
      a face recognition training component to program the processor to generate a face recognition profile for a specific person determined by programming the processor to perform the following:
         selecting sets of classifiers as matching the faces identified in the multiple different images;
         statistically analyzing the sets of classifiers to generate a reference classifier profile of the face associated with the specific person;
         repeating the generating, identifying, selecting and statistically analyzing one or more times to generate one or more further reference classifier profiles of the face associated with the specific person;
         normalizing the reference classifier profiles to determine normalized face classifiers of an average face associated with the specific person;
      a face recognition component to determine when a probability exceeds a predetermined threshold that an identified face corresponds to the specific person associated with the face recognition profile, and to initiate a workflow, image processing or other pre- or post-image acquisition action on the portable camera-enabled device when the face belonging to the specific person is thereby recognized.

11. The device of claim 10, wherein the multiple different images comprise two or more different poses of the face.

12. The device of claim 11, wherein the multiple different images comprises two or more different lighting conditions of the face.

13. The device of claim 10, wherein the multiple different images comprises two or more different lighting conditions of the face.

14. The device of claim 10, wherein the multiple statistically analyzing comprises determining mean and variance values for the sets of classifiers.

15. The device of claim 10, wherein the processor-readable code further comprises a face tracker component to program the processor to track said face within a plurality of images.

16. The device of claim 15, wherein the selecting comprises aligning face region subwindows and determining probabilities for classifiers based upon which the sets of classifiers are selected.

17. The device of claim 15, wherein the face tracking and recognition components are configured to operate simultaneously.

18. The device of claim 10, wherein the processor-readable code further for programming the processor to determine probabilities for classifiers based upon which the sets of classifiers are selected.

19. One or more non-transitory processor-readable storage media having code embedded therein for programming a processor to perform a method of in-camera face recognition training of a specific face within digital images acquired with a portable camera-enabled device, wherein the method comprises:

using a processor of a portable camera-enabled device;
generating in the device, capturing or otherwise obtaining in the device multiple different images that include a face of a specific person;
identifying groups of pixels that correspond to the face within the multiple different images;
selecting sets of classifiers as matching the faces identified in the multiple different images;
statistically analyzing the sets of classifiers to generate a reference classifier profile of the face associated with the specific person;
repeating the generating, identifying, selecting and statistically analyzing one or more times to generate one or more further reference classifier profiles of the face associated with the specific person;
normalizing the reference classifier profiles to determine normalized face classifiers of an average face associated with the specific person;
generating a face recognition profile for the specific person based on the normalized face classifiers of the average face of the specific person; and
programming the processor such that when a probability exceeds a predetermined threshold that an identified face corresponds to the specific person associated with the face recognition profile, then the processor initiates a workflow, image processing or other pre- or post-image acquisition action on the portable camera-enabled device based on the recognition of the face as belonging to the specific person.

20. The one or more processor-readable storage media of claim 19, wherein the different images comprise two or more different poses of the face.

21. The one or more processor-readable storage media of claim 20, wherein the different images comprises two or more different lighting conditions of the face.

22. The one or more processor-readable storage media of claim 19, wherein the different images comprises two or more different lighting conditions of the face.

23. The one or more processor-readable storage media of claim 19, wherein the statistically analyzing comprises determining mean and variance values for the sets of classifiers.

24. The one or more processor-readable storage media of claim 19, wherein the method further comprises tracking said face within the plurality of the relatively low resolution images.

25. The one or more processor-readable storage media of claim 24, wherein the selecting comprises aligning face region subwindows and determining probabilities for classifiers based upon which the sets of classifiers are selected.

26. The one or more processor-readable storage media of claim 24, wherein the tracking is performed in parallel with determining whether the identified face corresponds to the specific person.

27. The one or more processor-readable storage media of claim 19, wherein the method further comprises determining probabilities for classifiers based upon which the sets of classifiers are selected.

* * * * *